Nov. 9, 1965  T. M. JONES  3,216,391
SPIDER CRAFT

Filed Sept. 8, 1964  2 Sheets-Sheet 1

INVENTOR.
TERENCE M. JONES
BY
James Harrison Bowen
ATTORNEY

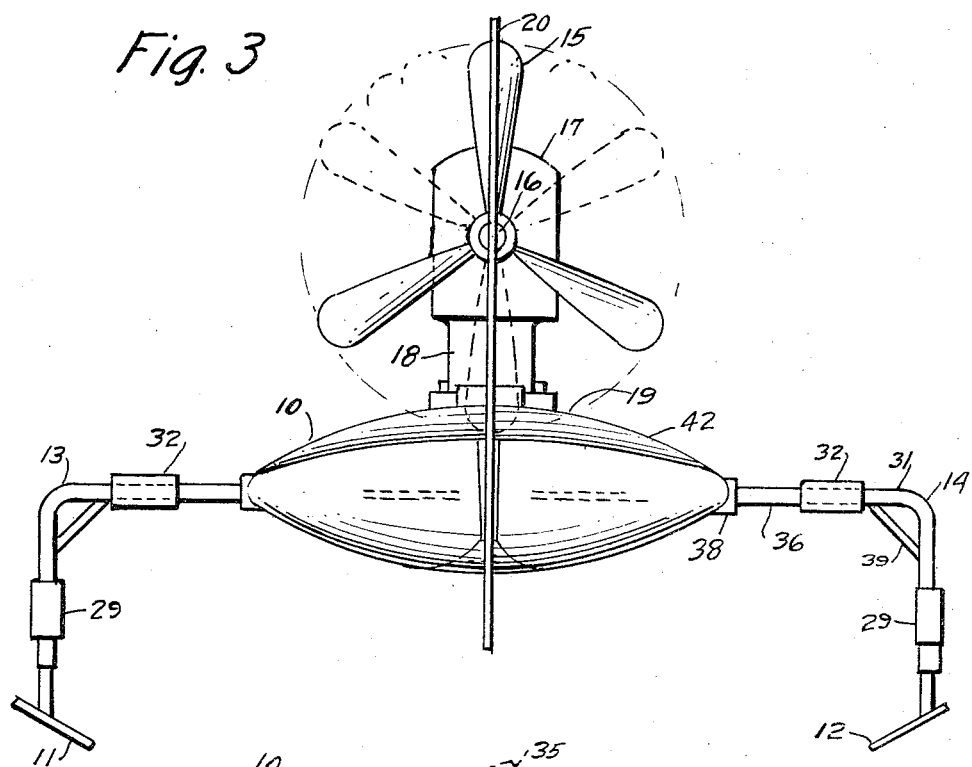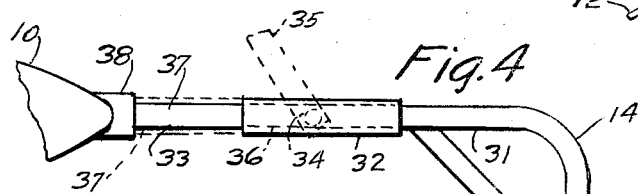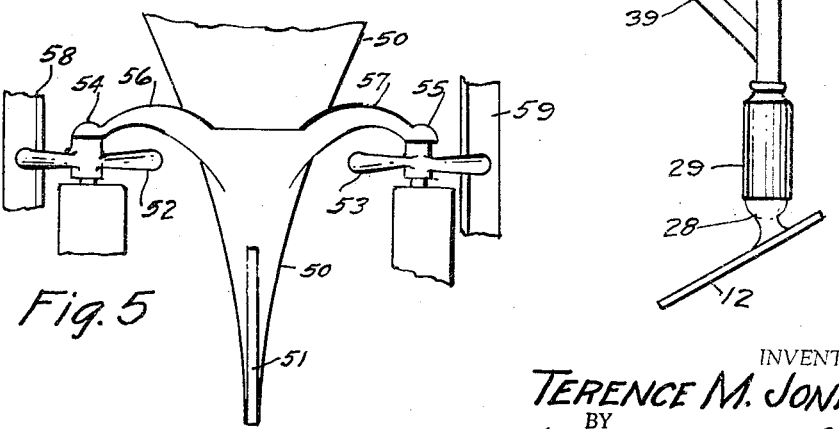

United States Patent Office 3,216,391
Patented Nov. 9, 1965

3,216,391
SPIDER CRAFT
Terence M. Jones, Rte. 1, Dixon Mills, Ala.
Filed Sept. 8, 1964, Ser. No. 394,818
1 Claim. (Cl. 114—66.5)

The present invention relates to hydro-vehicles of the spider craft type having water skis mounted by arms on the sides of a fuselage of water craft, and in particular a fuselage having a transversely disposed propeller mounted on and actuated by a motor or engine on the trailing portion of the fuselage, and water skis stationarily mounted by spider-like arms on sides of the fuselage.

The purpose of this invention is to provide a self-propelled hydro-plane or spider craft capable of carrying an operator and one or more passengers, in which a fuselage is supported on skis.

Various types of hydro-planes and other craft for traveling on water have been provided and some of such machines are self-propelled. However, the frame or housing of conventional hydro-planes or the like, is comparatively heavy and, consequently, it is difficult to support such craft in an elevated position on the water.

With this thought in mind this invention contemplates a fuselage similar to that of a hydro-plane with depending fixedly mounted arms attached to the fuselage and skis and with a propeller carried and operated by a motor on the fuselage and positioned behind a cockpit in which an operator and passengers may be positioned.

The object of this invention is, therefore, to provide a spider craft in which a fuselage may be mounted on water skis and driven by a motor operated propeller.

Another important object of the invention is to provide a spider craft having an elongated hollow body mounted by braces on skis with a rudder on the trailing end and with a propeller and operating means thereof positioned forward of the rudder.

A further object of the invention is to provide a hydrocraft having a fuselage with a cockpit in the forward portion thereof and a rudder on the trailing end in which the fuselage is supported by braces on skis.

A still further object of the invention is to provide a spider craft which is of a comparatively simple and economical construction.

Other and further objects and advantages of the present invention will be apparent from the following detailed description, drawings and claim, the scope of the invention not being limited to the illustrations of the drawings as the drawings are only for the purpose of illustrating a method by which the principles of this invention can be applied.

Other embodiments of the invention utilizing the same or equivalent principles may be used and structural changes may be made as desired by those skilled in the art without departing from the present invention and the purview of the appended claim.

With these and other objects and advantages in view the invention embodies a spider craft having an elongated fuselage with water skis positioned at the sides and stationarily connected by braces thereto in which the craft is driven by a motor operated propeller mounted on the fuselage and also in which the direction of travel of the spider craft is controlled by a rudder.

Other features and advantages of the invention will appear from the following description taken in connection with the drawings, wherein:

FIGURE 3 is a rear elevational view of the improved spider craft.

FIGURE 4 is a view showing one of the braces or supports for mounting the fuselage on the water skis.

FIGURE 5 is a plan view of the rear portion of the spider craft illustrating a modification wherein the craft is provided with twin engines and propellers.

Figure 1:
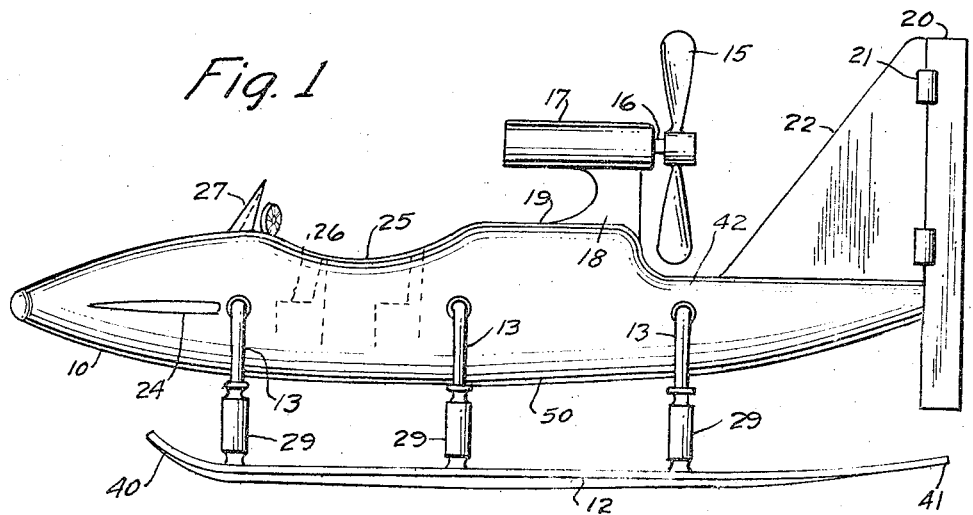
FIGURE 1 is a side elevational view showing the spider craft with water skis depending therefrom.
Figure 2:
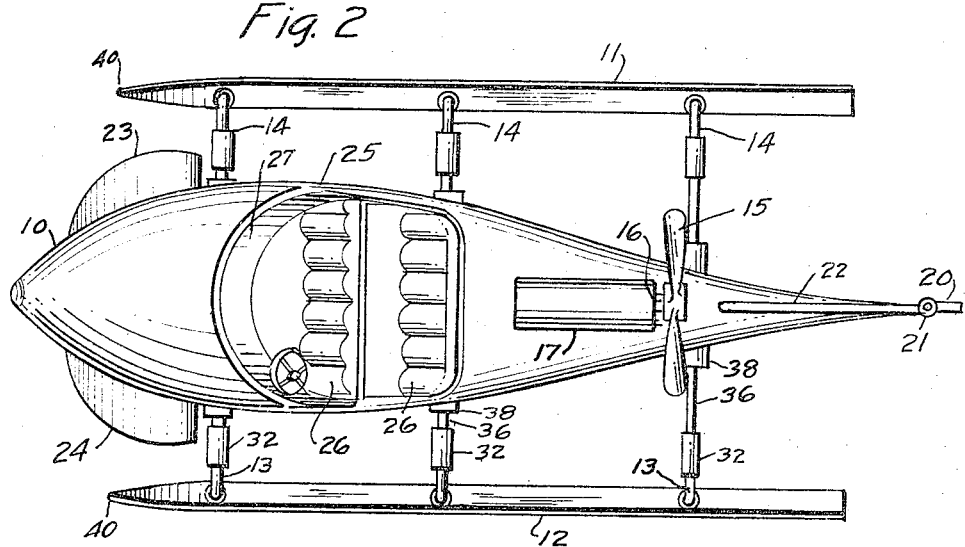
FIGURE 2 is a plan view of the spider craft.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the numeral 10 indicates the fuselage which may be made of sheet material, fiber glass, or the like, numerals 11 and 12 skis attached to the sides of the fuselage by arms 13 and 14, numeral 15 a propeller rotatably mounted by shaft 16 on a motor or engine 17 which is mounted by a pedestal 18 on a high portion 19 of the fuselage, numeral 20 indicating a rudder pivotally mounted by hinges 21 on a plate 22, and numerals 23 and 24 horizontally positioned fins on the leading end of the fuselage.

The fuselage or body of the craft is provided with a cockpit 25 having seats 26 therein, and a windshield 27, which extends upwardly from the leading end of the cockpit.

The skis 11 and 12 are mounted, as illustrated in FIGURE 4 on lower ends 28 of shock absorbers 29 on lower ends of vertical sections 30 of the L-shaped arms 13 and 14. The vertical sections 30 are integral with horizontal sections 31 of the arms and the sections 31 are connected by sleeves 32 to rods 33 by pins 34 that permit outer ends of the arms and skis to swing upwardly about the pins 34 as indicated by the dotted lines 35. The pins 34 pivotally connect the parts 31 of the arms to the ends 36 of rods 37 that extend from bosses 38 on the sides of the fuselage. The sleeves 32 slide over the sections 31 and rods 33 retaining the upper portions of the arms in horizontal positions. The outer portions of the arms are reinforced by diagonal braces 39.

The leading ends of the skis are provided with upwardly extending arcuate points 40 and similar points 41 may be provided on the trailing ends. The rear portion of the fuselage drops downwardly to a surface 42 to provide clearance for tips of the propeller blades 15.

In the design illustrated in FIGURE 5 a fuselage 50, provided with a rudder 51, is provided with twin propellers 52 and 53 which are carried by bearings 54 and 55 at the ends of arms 56 and 57. The propellers 52 and 53 are positioned above skis 58 and 59, as shown. It will be understood that as many engines and propellers may be used as may be desired.

With the parts assembled as illustrated and described the lower arcuate surface 60 of the fuselage rests upon the surface of the water when the craft is stationary, the skis and supporting braces or arms and also the lower edge 61 of the rudder are immersed in the water whereby the rudder steers the craft; and as the craft is started the skis gradually force the fuselage upwardly until skis are positioned to travel on the surface of the water. By this means the craft may travel at relatively high speeds.

From the foregoing description, it is thought to be obvious that a spider craft constructed in accordance with this invention is particularly well adapted for use, by reason of the convenience and facility with which it may be assembled and operated, and it will also be obvious that the invention is susceptible of some change and modification without departing from the principles and spirit thereof, and for this reason it is not desired to be limited to the precise arrangement and formation of the several parts herein shown in carrying out the invention in practice, except as claimed.

What is claimed is:

In a hydro-craft, the combination which comprises (a) a fuselage having a cockpit therein, (b) parallel longitudinally disposed skis spaced from the sides of the fuselage and positioned in a horizontally disposed plane spaced below the lower surface of the fuselage, (c) the upper surface of said fuselage having a step-down propeller receiving section spaced forwardly from the rear thereof, (d) a motor driven propeller mounted on the upper surface of the fuselage and arranged to drive said hydro-craft, (e) a vertically disposed rudder pivotally mounted on the trailing end of the fuselage, (f) and longitudinally spaced transversely disposed L-shaped arms having horizontal sections extended from sides of the fuselage, and vertical sections depending from extended ends of said horizontal sections and secured to upper surfaces of said skis, said L-shaped arms having pivotal connections therein, and sleeves slidably mounted on said arms and positioned to extend over said pivotal connections to retain said arms in extended positions.

References Cited by the Examiner

UNITED STATES PATENTS

| | | |
|---|---|---|
| 1,823,735 | 9/31 | Glasby. |
| 2,165,633 | 7/39 | Hunt _____ 114—43 |
| 2,387,907 | 10/45 | Hook _____ 114—66.5 |
| 2,895,757 | 7/59 | Kaspar _____ 287—98 |
| 3,065,722 | 11/62 | Green _____ 115—6.1 X |
| 3,081,729 | 3/63 | Lee _____ 114—66.5 |
| 3,099,239 | 7/63 | Von Schertel et al. ____ 114—66.5 |

FOREIGN PATENTS 652,839  11/62  Canada.

FERGUS S. MIDDLETON, *Primary Examiner.*

MILTON BUCHLER, *Examiner.*